Oct. 6, 1931.  P. W. FASSLER  1,826,207
WELDING MACHINE
Filed Dec. 26, 1929   3 Sheets-Sheet 1

INVENTOR.
Peter W. Fassler
BY
ATTORNEY.

Oct. 6, 1931.  P. W. FASSLER  1,826,207
WELDING MACHINE
Filed Dec. 26, 1929   3 Sheets-Sheet 2

INVENTOR.
Peter W. Fassler
BY
ATTORNEY.

Oct. 6, 1931.  P. W. FASSLER  1,826,207
WELDING MACHINE
Filed Dec. 26, 1929   3 Sheets-Sheet 3

INVENTOR.
Peter W. Fassler
BY
Stuart C. Barnes
ATTORNEY.

Patented Oct. 6, 1931

1,826,207

UNITED STATES PATENT OFFICE

PETER W. FASSLER, OF DETROIT, MICHIGAN, ASSIGNOR TO GENERAL MOTORS CORPORATION, OF DETROIT, MICHIGAN, A CORPORATION OF DELAWARE

WELDING MACHINE

Application filed December 26, 1929. Serial No. 416,357.

This invention relates to a machine for welding articles together and has to do particularly with a machine for effecting a rapid welding action. In this regard the work, or rather multiple pieces of work are automatically presented to the welding instruments and in this regard the invention contemplates a movable work carrier.

The invention is carried out in the present instance by providing stationary welding instruments, that is, relatively stationary in that the welding operation is performed at substantially the same location, together with a rotary table for holding the work having also welding instruments. Means are provided for moving the table with a step by step movement in proper timed relation with successive welding operations and means are also provided for the automatic removal of the work after the welding is completed.

In the accompanying drawings:

Fig. 5 is an enlarged detail illustrating the relative position of the parts at welding position.

Fig. 6 is a top plan view of the illustration shown in Fig. 5.

Figure 1:
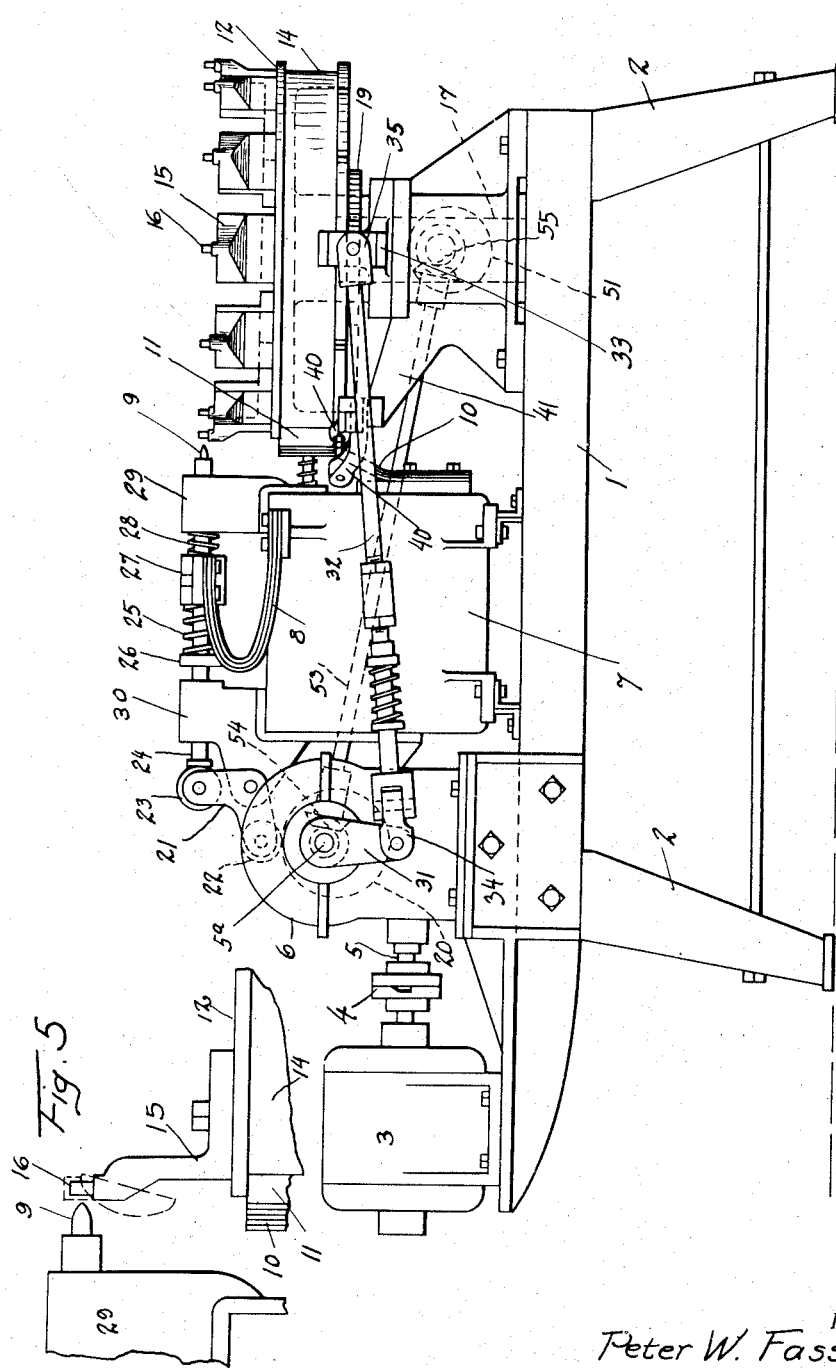
Fig. 1 is a side elevational view of a machine constructed in accordance with the invention, showing some of the operating mechanism in dotted lines.

The welding machine of this invention may be advantageously mounted upon a supporting table 1 having legs 2, and the table may support a suitable motor 3 for furnishing power for operating the same. The motor is connected through a clutch 4 to the main drive shaft 5, through suitable gears in housing 6. The gears are not shown, as the manner in which these may be arranged within the housing is well understood to those versed in the art.

A suitable transformer of the usual type employed in welding machines of this nature is illustrated at 7 and leading from this transformer is a contact spring 8 having electrical contact with a welding point 9. Also, leading from the transformer is a conductor 10 leading to a suitable brush 11. There is a rotary table 12 against which this brush functions and for this purpose, springs 13 backed up by the transformer housing at one end are employed for urging the brushes into brushing engagement with the table. The table may have a groove 14 in which the brushes fit.

Mounted upon this rotary table are a plurality of work holders 15, each having a welding point 16. In the operation of the device, the table is moved with step by step movement to successively present points 16 to point 9 to effect a welding operation. The holders 15 as shown herein, are designed for supporting work of a special nature but it is to be understood that it is within the invention to form these work holders in any shape so that various types of work can be handled.

Figure 4:
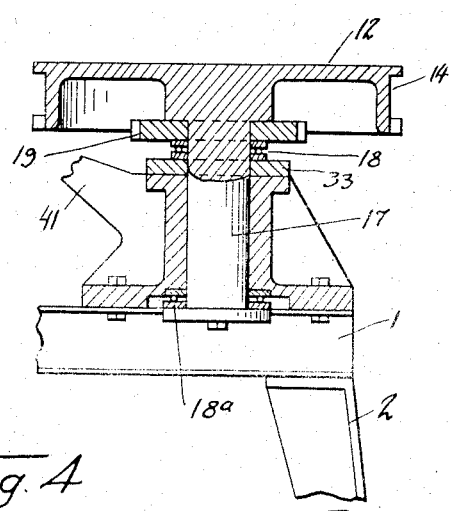
Fig. 4 is a sectional view illustrating the mounting of the rotary table.

Referring to Fig. 4, it will be noted that the table is journaled upon a spindle or post 17 and that an antifriction bearing 18 and also an antifriction bearing 18a are employed. A suitable ratchet wheel or toothed wheel 19 is secured to the table or post to rotate therewith.

Connected to the main drive shaft 5 is another shaft 5a (Fig. 2) having mounted thereon a cam 20. A cam follower is provided and it may be in the form of a bell crank 21 having a roller 22 engaging the cam and another roller 23 engaging a plunger 24. This plunger is associated with the welding point 9 and the plunger is held into contact with the roller 23 as by means of a spring 25. This spring also serves to cause the cam follower to remain in contact with the same, the said cam being of the open face type. The plunger may terminate in an enlarged abutment 26 and the spring 25 is located between this abutment and a bracket 27 clamped to the rod supporting the welding point. Another spring 28 is positioned between this clamp and a bracket 29. The contact spring 8 also connects with the clamp member 27. Accordingly, as the cam 20 rocks the bell crank, the plunger 24 reciprocates in bracket 30 and urges the welding point from left to right as Fig. 1 is viewed under the compressive spring action of the spring 25. The springs 25 and 28 serve to keep the clamp member 27 centralized.

Figure 2:
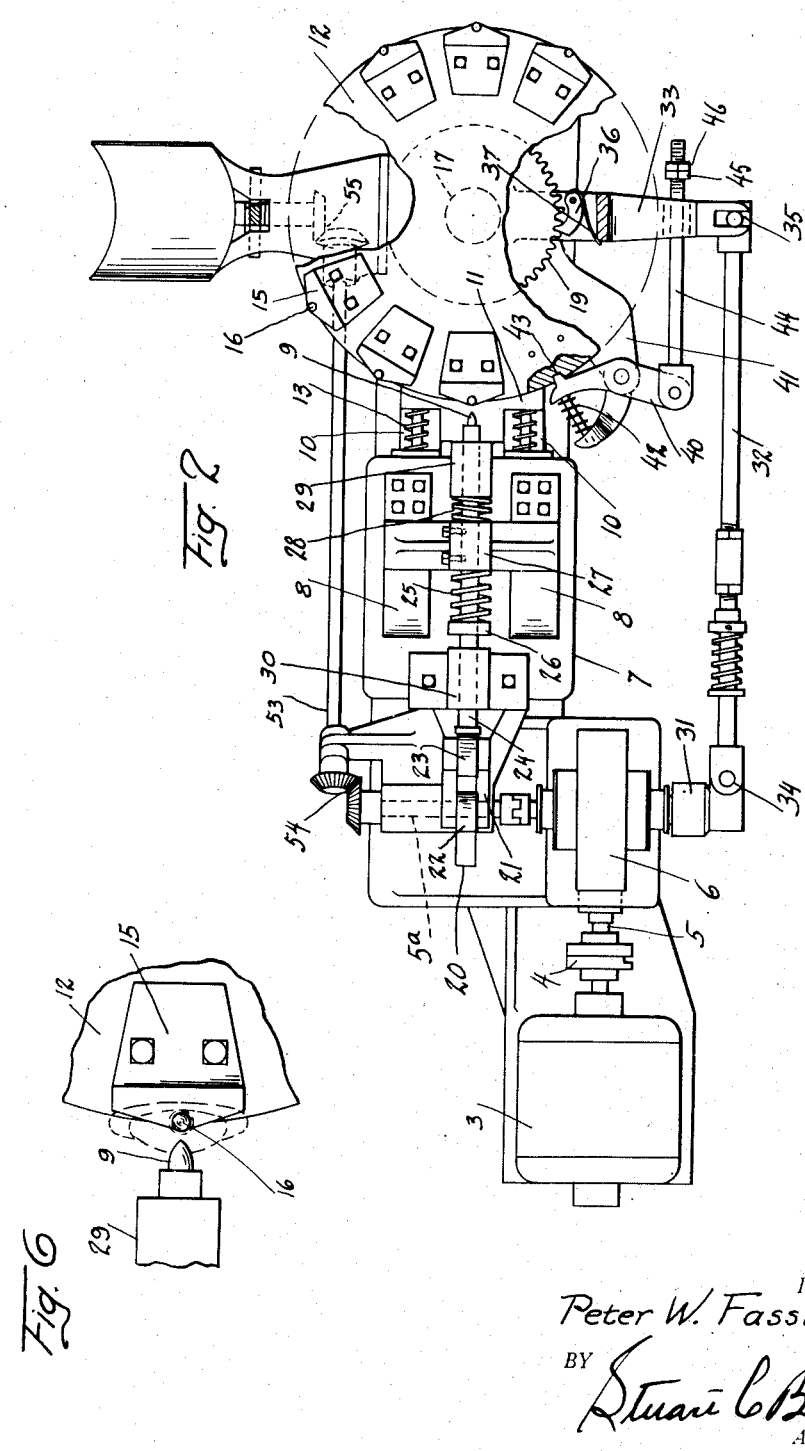
Fig. 2 is a top plan view with some parts cut away to show underlying mechanism.

A crank 31 is connected to the main drive shaft and this crank has a connecting rod 32 connected to the crank and also to a lever 33. Due to the angular movements of the lever, the crank connecting rod is preferably connected to the crank and lever through the means of connections of the universal type as illustrated at 34 and 35 respectively. The lever carries a pawl 36 acted upon by a spring 37, the pawl cooperating with the ratchet wheel 19. Accordingly, the pawl and ratchet construction moves the table step by step as the lever 33 is reciprocated, the table moving clockwise as Fig. 2 is viewed.

Means are provided for positively holding the table from rotation during the period when the pawl is moved with ratchet-like action over the teeth of the ratchet wheel. This means comprises a rocker arm 40 pivotally mounted upon a bracket 41 and acted upon by spring 42. This rocker arm has a detent 43 which engages in co-operating recesses with the table. Pivotally connected to the rocker arm 40 is a rod 44 having a sliding connection with the lever arm 33, the said rod having an abutment for engaging with the lever 33 at the proper time; this abutment may comprise a nut 45 and lock nut 46 screw threaded onto the rod.

In the operation of this construction, it will be appreciated that as the lever 33 moves counter-clockwise the pawl 36 slides over the teeth on the ratchet wheel while the rocker arm 40 holds the table locked. At substantially the end of the clockwise movement of the lever 33, the nut 45 is engaged so that arm 40 is rocked and its detent is withdrawn from a notch in the table. The parts are so co-ordinated that the detent is held withdrawn until the lever 33 has had considerable movement in reverse direction, moving with it the table. This moves the notch out of alignment with detent 43 so that as the lever 33 releases the abutment 45, the detent 43 merely frictionally engages the rotating table and drops into the next succeeding notch when the table has been properly positioned for locating one of its plurality of welding points next adjacent the welding point 9.

In the operation of the machine, the moving electrode 9 and the table, move in timed relation so that each time the electrode 9 is projected, the table is held stationary with one of its electrodes presented to the welding point 9. The machine requires at least one operator standing near the table for placing the work on the welding brackets.

The brackets shown on the present machine are designed for holding a special type of work which is illustrated best in Fig. 5; the work comprises a reflector which is rather cup-shaped and to which is to be welded a tubular neck. As mentioned above, the brackets may be of any design for taking care of any type of work.

Figure 3:
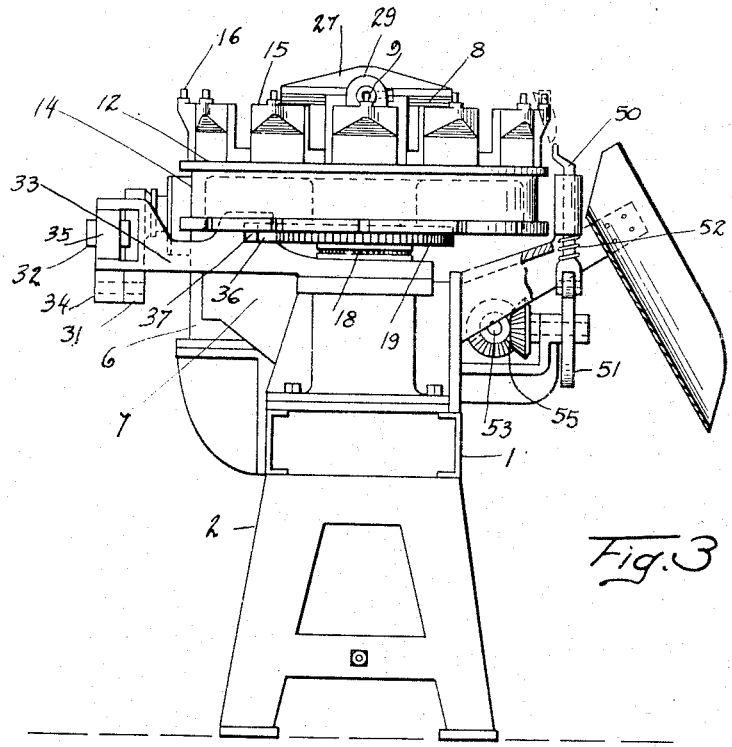
Fig. 3 is an end elevation taken from the right hand end of Fig. 1 also with some parts cut away.

Means are provided for removing the completed work from the table. Such means may take the form of a reciprocating plunger 50 acted upon by a cam 51 and held against the cam by spring 52. This cam is rotated by means of a shaft 53 having pinion gear connection as illustrated at 54 with shaft 5a and at 55 with the shaft carrying the cam. The manner of operation will be understood by reference to Fig. 3; the plunger is lifted by the cam and lifts the work off a bracket. A chute 55 may be provided into which the work falls and is directed away from the machine.

Claims:

1. A welding machine comprising in combination, a movable welding point, means automatically moving the point, a rotary table, a plurality of work carriers on the table, a welding point associated with each work carrier and carried by the table, means for rotating the table with step by step movement to successively present the work to the movable welding point, said welding point moving in timed relation to the step by step movement of the table so that it moves into welding relation to the welding point presented to it during the period of rest of the table.

2. A welding machine comprising in combination, a movable welding point, means automatically moving the point, a rotary table, a plurality of work carriers on the table, a welding point associated with each work carrier, means for rotating the table with step by step movement to successively present the work to the movable welding point, said welding point moving in timed relation to the step by step movement of the table so that it moves into welding relation to the welding point presented to it during the period of rest of the table, and means for removing the welded work from the work carrier.

3. In a welding machine, a welding point, a rotary table provided with a plurality of welding points, means for rotating the table with step by step movement to successively present the welding points on the table to the first mentioned welding point, conductors for the electrical current, and a brush having contact with the rotary table for conducting current to the welding points thereon.

4. A welding machine comprising a transformer housing, a welding point mounted adjacent one side of the transformer housing and electrically connected therewith, a rotary table mounted adjacent another side of the transformer housing and having a plurality of welding points, an electrical conductor between the transformer and table comprising a brush for wiping the table, and means for successively presenting the plurality of welding points on the table to the first mentioned welding point by rotating the table step by step.

5. A welding machine comprising a transformer, an operating shaft on one side of the transformer, a rotary table on the other side of the transformer, a movable welding point positioned between the operating shaft and the table, a plurality of circumferentially spaced welding points on the table, a conductor connecting the transformer with the first mentioned welding point, a brush wiping the table and also connected to the transformer, and means operating from said shaft for moving the table with step by step movement and for moving the first mentioned welding point in timed relation.

6. A welding machine comprising a transformer, an operating shaft on one side of the transformer, a rotary table on the other side of the transformer, a movable welding point positioned between the operating shaft and the table, a plurality of circumferentially spaced welding points on the table, a conductor connecting the transformer with the first mentioned welding point, a brush wiping the table and also connected to the transformer, means operating from said shaft for moving the table with step by step movement and for moving the first mentioned welding point in timed relation thereto, and means on the table and associated with the welding points thereon for holding work.

7. A welding machine comprising a transformer, an operating shaft on one side of the transformer, a rotary table, on the other side of the transformer, a movable welding point positioned between the operating shaft and the table, a plurality of circumferentially spaced welding points on the table, a conductor connecting the transformer with the first mentioned welding point, a brush wiping the table and also connected to the transformer, means operating from said shaft for moving the table with step by step movement and for moving the first mentioned welding point in timed relation thereto, means on the table and associated with the welding points thereon for holding work, and means operating from said shaft for removing welded work.

8. In a welding machine, a relatively stationary welding point, a rotary table carrying a plurality of welding points, means for removing the table step by step to present the welding points thereon successively to the first mentioned welding point and means for locking the table against movement during the periods of rest between its movements.

9. In a welding machine, a relatively stationary welding point, a rotary table carrying a plurality of welding points, means for removing the table step by step to present the welding points thereon successively to the first mentioned welding point, and means for locking the table against movement during the periods of rest between its movements, said locking means being associated with the table moving means so as to be released thereby to permit table movement and held released until partial movement of the table in a step.

10. In a welding machine, a relatively stationary welding point, a rotary table having a plurality of welding points, a pawl and ratchet construction for moving the table step by step, a reciprocating member for effecting relative movement between the pawl and ratchet, a lock, means on the table with which the lock engages to hold the table from rotation between its movements, and means connecting the lock to the reciprocating member to release the same near one end of movement of the reciprocating member.

11. In a welding machine, a relatively stationary welding point, a rotary table having a plurality of welding points, a pawl and ratchet construction for moving the table step by step, a reciprocating member, for effecting relative movement between the pawl and ratchet, a lock, means on the table with which the lock engages to hold the table from rotation between its movements, means connecting the lock to the reciprocating member to release the same near one end of movement of the reciprocating member, said reciprocating member holding the lock released until partial table movement, and means for automatically urging the lock into locking engagement with the table at the end of each step by step movement.

In testimony whereof I have affixed my signature.

PETER W. FASSLER.